United States Patent [19]

Eckert et al.

[11] Patent Number: 4,850,650
[45] Date of Patent: Jul. 25, 1989

[54] HIERARCHICAL BRAKE CONTROLLER

[75] Inventors: Steve J. Eckert, Troy; Mutasim A. Salman, Rochester; Nader M. Boustany, Birmingham, all of Mich.

[73] Assignee: General Motors Corporation, Detroit, Mich.

[21] Appl. No.: 239,908

[22] Filed: Sep. 2, 1988

[51] Int. Cl.$^4$ .............................................. B60T 13/00
[52] U.S. Cl. .................. 303/9.62; 303/9.71; 303/100; 303/108
[58] Field of Search .................. 303/9.62, 9.69, 9.71, 303/93, 94, 95, 100, 107, 108, 109, 113, 100; 364/426.02; 188/182

[56] References Cited

U.S. PATENT DOCUMENTS

| | | | |
|---|---|---|---|
| 3,475,059 | 10/1969 | Klein | 303/9.69 |
| 4,760,893 | 8/1988 | Sigl et al. | 303/109 |
| 4,768,840 | 9/1988 | Sullivan et al. | 303/9.62 |

Primary Examiner—George E. A. Halvosa
Assistant Examiner—Matthew C. Graham
Attorney, Agent, or Firm—Howard N. Conkey

[57] ABSTRACT

A hierarchical brake controller is described having two control levels, a high level supervisory controller and a low local controller. The supervisory controller receives a vehicle deceleration rate command from the vehicle operator and determines a commanded brake line pressure value to establish the actual vehicle deceleration at the operator commanded rate. The supervisory controller then proportions the commanded brake line pressure between the front and rear brakes based on a determined proportioning factor. The local controller at each wheel functions to establish the respective commanded front or rear brake line pressure. In addition, the local controller for each of the rear brake limits the applied brake pressure in response to a sensed incipient wheel lockup condition to prevent lockup of the braked wheel. The local controller for a rear brake that is limiting brake pressure to prevent a lockup condition provides a maximum allowable rear brake pressure value to the supervisory controller. The supervisory controller then limits the commanded brake line pressure and therefore the commanded front brake line pressure to values based on the maximum allowable rear brake pressure and the proportioning value between the front and rear brakes.

6 Claims, 7 Drawing Sheets

HIERARCHICAL BRAKE CONTROLLER

This invention relates to a hierarchical braking control system.

Drive-by-wire braking control systems for controlling the wheel brakes of a motor vehicle are known wherein a brake controller responds to a vehicle operator brake pressure command to establish the commanded pressure at each of the wheel brakes. These systems may also provide for limiting the brake pressure at a wheel to prevent the wheel from locking. It is typical of these systems to have independent uncoordinated control of each of the front and rear brakes. However in some brake controllers, the rear brakes are controlled together but independent of the front brakes.

This invention provides for an improved drive-by-wire brake control system. In general, this invention is directed toward a hierarchical brake controller having two control levels, a high level supervisory control level and a low local control level. At the local control level, a local controller for each wheel receives information about its own wheel and brake subsystem and tries to maintain the subsystem variables at values close to those commanded by the supervisory controller. At the high supervisory control level, a supervisory controller gets information about the vehicle systems (through which the braking subsystems interact) and tries to achieve the overall braking objectives by coordinating the actions of the local controllers.

More specifically, the supervisory controller receives a vehicle deceleration rate command from the vehicle operator and determines a commanded brake line pressure value to establish the actual vehicle deceleration at the operator commanded rate. The supervisory controller then proportions the commanded brake line pressure between the front and rear brakes based on a determined proportioning factor.

The local controller at each wheel functions to establish the respective commanded front or rear brake line pressure. In addition, the local controller for each of the rear brakes limits the applied brake pressure in response to a sensed incipient wheel lockup condition to prevent lockup of the braked wheel. The local controller for a rear brake that is limiting brake pressure to prevent a lockup condition provides a maximum allowable rear brake pressure value to the supervisory controller. The supervisory controller then limits the commanded brake line pressure and therefore the commanded front brake line pressure to values based on the maximum allowable rear brake pressure and the proportioning value between the front and rear brakes.

By using the hierarchical braking control system of this invention, several advantages can be realized. One such advantage is improved braking performance. The coordinator distributes the braking effort among the local controllers as a function of vehicle deceleration so as to optimize braking performance. Another advantage is an increase in the braking system reliability. The coordinator compensates for any actuator failure by redistributing the braking effort among the remaining operating local controllers. Yet another advantage is the increased robustness to changes in hardware or system parameters. In this sense, the controller can minimize the effect on overall vehicle braking performance caused by any deterioration of performance of any of the local controllers. The system further has the advantage of design simplicity and ease of implementation in that the control problem is divided into lower order control problems which simplifies the design process and decreases the computation effort required in the implementation.

The invention may be best understood by reference to the following description of a preferred embodiment and the drawings in which.

Figure 4:
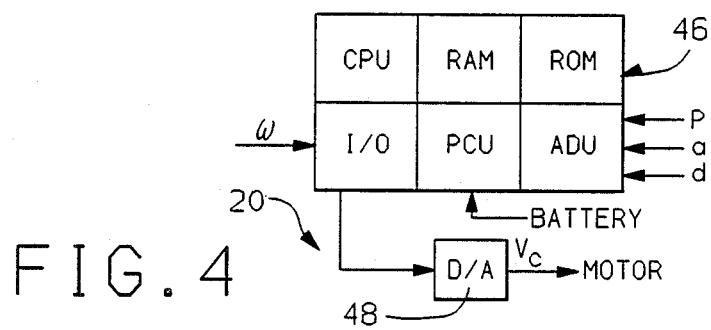
FIG. 4 is a diagram of the electronic controller of FIG. 1.

FIGS. 5, 6, 7, 8, and 9 comprise a flow chart illustrating the operation of the controller of FIG. 4.

Figure 1:
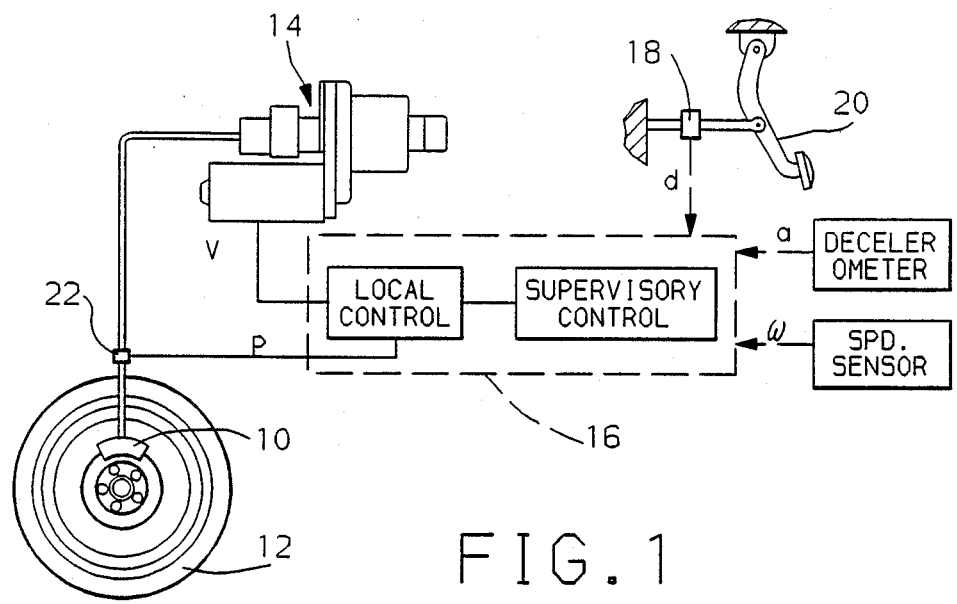
FIG. 1 is a general diagram of a brake-by-wire system for controlling the brakes of a vehicle in accord with the principles of this invention.

A general overview of the brake-by-wire system for controlling the pressure applied to the brakes of the front and rear wheels of a vehicle is illustrated in FIG. 1. The control of a brake of a single wheel is illustrated, it being understood that the control of brakes of the remaining three wheels of the vehicle are identical thereto.

A standard wheel brake 10 for a wheel 12 is actuated by controlled hydraulic pressure from a motor driven pressure modulator 14. The pressure modulator 14 is controlled to establish a desired brake line pressure for operating the brake 10 by means of an electronic controller 16 that is responsive to the output of a brake pedal force sensor 18 providing a signal d that is a measure of the force applied to the vehicle brake pedal 20 and which comprises a vehicle operator deceleration command. The controller applies a voltage V to the pressure modulator 14 determined to produce a commanded brake pressure value.

Other signals provided to the electronic controller include a vehicle deceleration signal a (deceleration being represented herein by positive values of a) provided by a conventional vehicle mounted decelerometer and a signal representing the rotational velocity $\omega$ of the wheel 12 is also provided to the electronic controller 16. The wheel velocity signal $\omega$ may be provided by any conventional wheel speed sensor. For example, the wheel speed sensor may be comprised of an electromagnetic sensor sensing the rotation of a toothed wheel rotated by rotation of the wheel 12. The resulting speed signal is a series of pulses having a frequency that is a measure of the wheel speed.

An additional input to the electronic controller 16 is provided by a brake line pressure sensor 22 that generates a signal representing brake pressure P applied to the brake 10 by the pressure modulator 14.

As previously indicated, a pressure modulator 14 is provided and controlled by the controller 16 for establishing a brake pressure at the brakes of each of the remaining three vehicle wheels. In this regard, signals corresponding to the aforementioned signals specifically related to each of the remaining wheels is also provided to the controller 16.

The electronic controller 16 provides control functions at two control levels. A low local control level function is provided for each wheel and functions to establish the brake pressure applied to the corresponding wheel brake 10. A high supervisory control function is also provided which receives information in regard to the vehicle system and coordinates the local control level function to achieve the overall braking objectives.

Figure 2:
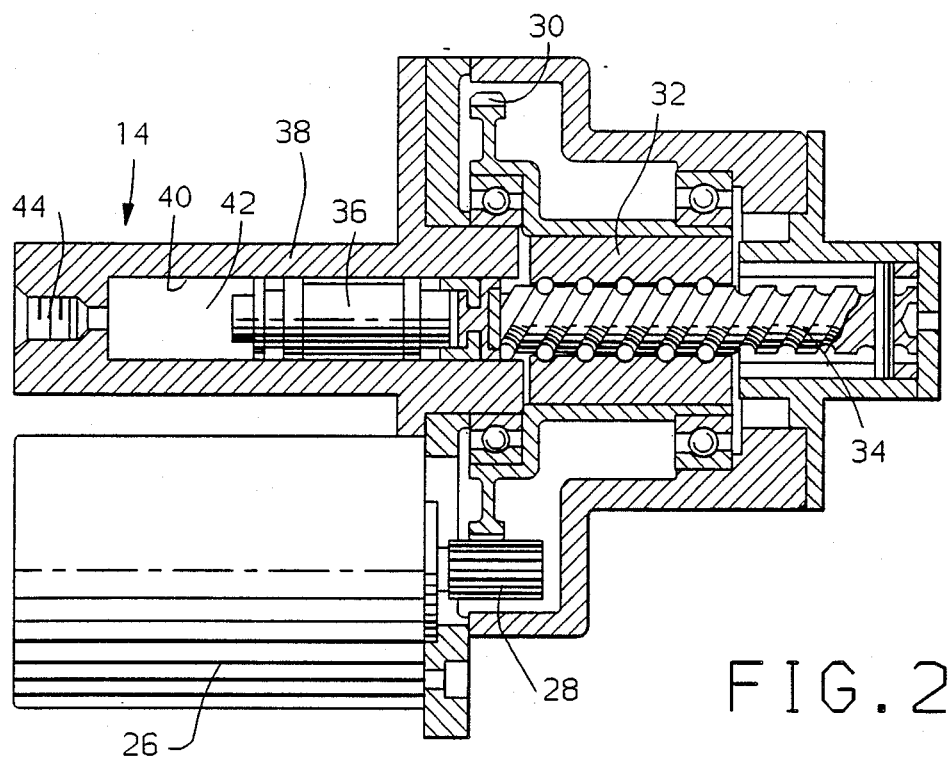
FIG. 2 is a cross-sectional view of a pressure modulator for each wheel for establishing brake pressure.

Referring to FIG. 2, the pressure modulator 14 for each vehicle wheel includes a DC torque motor 26 whose output shaft drives an input gear 28 which in turn rotatably drives an output gear 30. The drive member 32 of a ball screw actuator is secured for rotation with the output gear 30. The drive member 32 engages and axially positions the driven member 34 of the ball screw actuator. The driven member 34 drives a piston 36 to control the hydraulic pressure output of the pressure modulator 14. In summary, the torque output of the motor 26 is translated into a directly related hydraulic pressure output of the modulator 14 that is applied to the respective brake of the vehicle wheels.

As more particularly illustrated, the modulator 14 includes a housing 38 in which a cylinder 40 is formed. The piston 36 is reciprocally received in the cylinder 40 and defines therewith a chamber 42 that is filled with brake fluid. The modulator 14 has an outlet 44 from the chamber 42 which is connected to the wheel brake 10.

When a voltage is applied to the motor 26, the piston 36 is moved to apply brake pressure to the brake 10 until the hydraulic pressure acting on the piston 36 offsets the torque output of the motor 26 which is dependent upon the value of the applied voltage. In this embodiment, the ball screw and motor are back-drivable. In other words, the efficiency of the gears is high so that the motor output shaft is reverse driven by the hydraulic pressure acting on the piston 36 when it is greater than the torque output of the motor 26 until the hydraulic pressure is reduced to a level where it is overcome or offset by the torque output of the motor. Therefore, the pressure established by the modulator 14 may be increased or decreased simply by increasing or decreasing the voltage applied to the DC torque motor 26.

Figure 3:
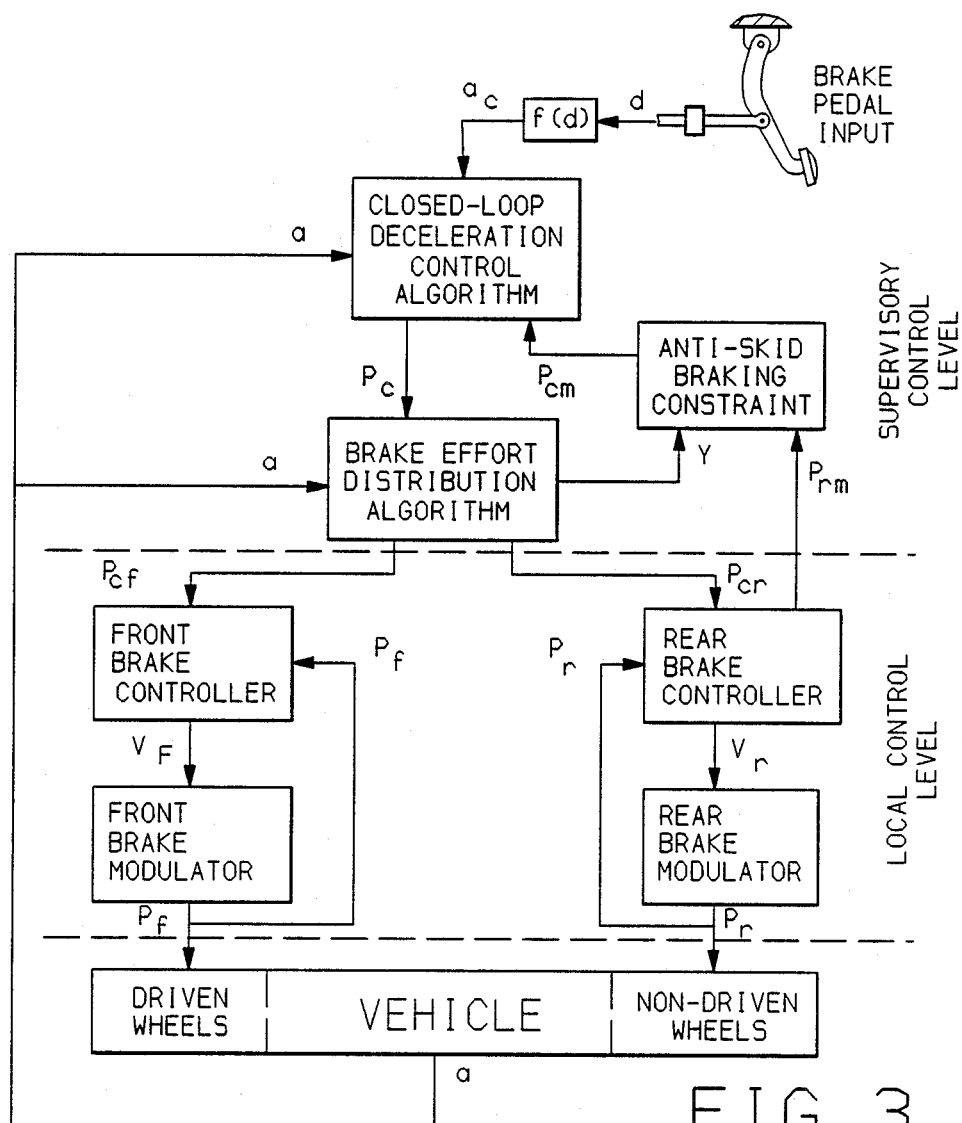
FIG. 3 is a block diagram illustrating the functions of the two control levels of the braking system of FIG. 1.

The hierarchical control strategy implemented by the electronic controller 15 of FIG. 1 is illustrated in FIG. 3. As previously indicated, the controller functions on two control levels. The supervisory control level responds to the driver input to the brake pedal as monitored by the force transducer 18 illustrated in FIG. 1. This input d is the vehicle operator's input to the brake system and represents the rate at which the operator would like the vehicle to decelerate. The supervisory controller then determines a commanded vehicle deceleration rate $a_c$ from the operator input value d, the relationship between d and the commanded deceleration rate $a_c$ being any arbitrary function $a_c = f(d)$ of the brake pedal input in order to program a desirable "feel" into the braking system.

The commanded deceleration rate is used as a reference trajectory for a closed loop deceleration control function which attempts to regulate the actual vehicle deceleration a measured by the vehicle mounted decelerometer around the desired value $a_c$. It should be noted that vehicle deceleration represented by the values a and $a_c$ are denoted by positive values. The closed loop deceleration control algorithm for establishing the actual vehicle deceleration a at the commanded value $a_c$ provides as an output value a commanded brake line pressure $P_c$ for the brake system.

The closed loop deceleration control algorithm of the supervisory controller takes the form of any conventional closed loop algorithm that may include, for example, proportional and integral control terms which adjust the value of the commanded brake pressure $P_c$ in direction to achieve the commanded vehicle deceleration value $a_c$.

It is well known that in order to achieve the maximum braking force (minimum stopping distance) in a vehicle, the ratio of the front to rear brake line pressures should be equal to the ratio of the normal forces (axle weights) on the front and rear wheels, respectively. As braking forces of the front and rear wheels of the vehicle are increased by application of brake pressures, a torque is produced about the vehicle's center of gravity. This torque will result in a lifting force on the rear wheels and a downward force on the front wheels. As a result, in order to achieve the maximum braking force, the ratio of the front to rear brake line pressures must be varied as a function of the rate at which the vehicle is being decelerated.

In general, the supervisory control function includes a brake effort distribution algorithm for determining the distribution of the brake effort between the front and rear brakes of the vehicle. This algorithm computes the fraction Y of the commanded brake pressure value $P_c$ that is to be allocated to the front wheel brakes. This fraction is determined by computing the normal force at the tire/ground interface for both the front and rear wheels. Assuming that $W_f(t)$ represents the computed normal force for the front axle and $W_r(t)$ represents the normal force for the rear axle, the optimal choice for the value of Y (the fraction of the commanded pressure $P_c$ to be allocated to the front brakes) is given by the expression:

$$Y/(1-Y) = W_f(t)/W_r(t). \tag{1}$$

Solving for Y, the following expression is obtained:

$$Y = W_f(t)/(W_f(t) + W_r(t)). \tag{2}$$

The values of $W_f(t)$ and $W_r(t)$ are obtained by summing the weight shift that occurs during braking with the known normal force K at steady state conditions at the respective front or rear axle in accord with the expression $$W(t) = K + \delta. \tag{3}$$

where $\delta$ is the deceleration dependent weight shift that occurs during braking. $\delta$ is computed by the following discrete time expressions:

$$\delta(k) = (G/\beta_o)(\alpha_o a(k) + \alpha_1 a(k-1) + \alpha_2 a(k-2)) + (\beta_1/\beta_o)\delta(k-1) + (\beta_2/\beta_o)\delta(k-2) \tag{4}$$

where $\alpha_o = \omega_n^2 T^2$, $\alpha_1 = 2\omega_n^2 T^2$, $\alpha_2 = \omega_n^2 T^2$, $\beta_o = 4 + 4\rho\omega_n T + \omega_n^2 T^2$, $\beta_1 = 8 - 2\omega_n^2 T^2$, and $\beta_2 = 4\rho\omega_n T - 4 - \omega_n^2 T^2$. In the foregoing expressions, $\omega_n$ is the natural frequency of the vehicle including the suspension spring constant and the unsprung mass, G is a constant that is a function of the vehicle, k denotes the discrete time index with k=0 denoting the sampling interval immediately before application of the brakes, T is the sampling rate and $\rho$ is a damping coefficient. Once the value of $\delta$ is computed for each of the front and rear axles, the normal force for the front and rear axles is then determined.

The values for the constants in the foregoing expressions are derived experimentally. A typical set of values is given by:

| Front Axle | Rear Axle |
|---|---|
| $\omega_n = 5.975$ | $\omega_n = 8.255$ |
| $\rho = 0.245$ | $\rho = 0.415$ |
| $G = 322$ | $G = -380$ |
| $K = 9898$ | $K = 5046$ |

From the computed normal forces for the front and rear axles, the value of Y representing the fraction of the commanded pressure $P_c$ that is allocated to the front brakes is determined. From this value, the brake effort distribution algorithm establishes a commanded pressure $P_{cf}$ for the front wheels and a commanded pressure $P_{cr}$ for the rear wheels in accord with the expressions $$P_{cf} = YP_c \text{ and} \qquad (5)$$

$$P_{cr} = (1 - Y) P_c.$$

At the local control level, each rear wheel has associated therewith a rear brake controller that establishes the brake pressure $P_r$ at the rear wheel equal to the commanded pressure value $P_{cr}$. In this regard, each rear brake controller includes a closed loop control function responding to the actual and commanded pressure values to provide a control voltage $V_r$ to the respective rear brake modulator including integral and proportional terms to establish the actual pressure $P_r$ equal to the commanded pressure $P_{cr}$.

Similarly, at the local control level, each front wheel has associated therewith a front brake controller that provides a control voltage $V_f$ to the respective front brake modulator including proportional and integral closed loop control terms to establish the pressure $P_f$ at the front wheels at the commanded value $P_{cf}$.

The front brake controllers simply provide for the closed loop control of the front wheel brake pressures at the commanded value $P_{cf}$. However, the rear brake controllers further provide for limiting the brake pressure applied to each of the rear brake modulators so as to prevent a wheel lockup.

If the applied brake pressure results in the slip of one of the rear wheels exceeding the critical slip value at which the coefficient of friction between the wheel and road surface is a maximum, the wheel may begin to approach a lockup condition. If either of the local rear brake controllers detects that the corresponding rear wheel is approaching an incipient lockup condition, an estimate of the maximum rear brake line pressure that can be applied before the rear wheels begin to lock is made, the maximum pressure being denoted by the value Prm. This maximum brake line pressure is provided to the supervisory controller which computes a limit $P_{cm}$ for the total brake line pressure. This maximum total brake line pressure $P_{cm}$ is determined by the expression $P_{cm} = (1/(1-Y)) P_{rm}$ where Y is the fraction of the commanded brake pressure allocated to the front brakes. The commanded brake pressure value $P_c$ is then limited to the value of $P_{cm}$. Therefore, the commanded front brake pressure $P_{cf}$ established as previously described from the limited commanded brake pressure $P_c$ and the value of Y establishing the fraction of $P_c$ allocated to the front brakes results in a front brake pressure being established that prevents an incipient wheel lockup condition at the front wheels.

One of the advantages of the aforementioned hierarchical control strategy is that in the event of the failure of one of the brake modulators, the brake pressures provided to the remaining three brake modulators are adjusted so as to maintain the commanded deceleration rate.

As specifically illustrated in FIG. 4, the electronic controller 16 in the present embodiment takes the form of a standard digital computer 46 providing an output to a standard digital-to-analog converter 48 for each wheel brake, only one of the digital-to-analog converters being illustrated. As indicated, the digital computer 46 is standard in form and includes a central processing unit (CPU) which executes an operating program permanently stored in a read only memory (ROM) which also stores tables and constants utilized in controlling the pressure to be applied to the brake 10 of each of the wheels. Contained within the CPU are conventional counters, registers, accumulators, flag flip flops, etc., along with a clock which provides a high frequency clock signal.

The computer 46 also includes a random access memory (RAM) into which data may be temporarily stored and from which data may be read at various address locations determined in accord with the address stored in the ROM. A power control unit (PCU) receives battery voltage and provides regulated power to the various operating circuits in the computer 46. The computer 46 further includes an input/output circuit (I/O). In controlling the individual brakes 10 of the wheels 12, the computer outputs a digital signal to the respective digital-to-analog converter 48 representing the desired voltage to be applied to the respective brake modulator to establish the commanded brake pressure.

The I/O also includes an input counter section which receives a pulse output from each of the wheel speed sensors representing the respective wheel velocity V, one of such inputs being illustrated. Wheel speed V is then determined such as by determining the number of clock pulses between wheel speed pulses.

An analog-to-digital unit (ADU) is included which provides for the measurement of analog signals. The analog signals representing conditions upon which the brake pressure to the brakes 10 is based are supplied to the ADU. In the present embodiment, those signals include the brake line pressure of each of the wheel brakes 10, one such value being illustrated. In regard to FIG. 3, these pressure values are the value $P_f$ for each of the front driven wheels and $P_r$ for each of the rear non-driven wheels.

Additional signals provided to the ADU include the acceleration signal a provided by the vehicle accelerometer and the brake pedal force d provided by the force sensor 18 representing the driver deceleration command. The various analog signals are sampled and converted under the control of the CPU and stored in respective ROM designated RAM memory locations. A flow chart of a typical control algorithm according to the invention is illustrated in FIGS. 5–9 which represents the portion of the program embodied in the ROM of the digital computer 46 for control of the pressure applied to each of the brake pressure modulators 14 for the two front driven wheel brakes and the two rear non-driven wheel brakes. The description of the program includes reference numerals within angle brackets < > which refer to the flow chart blocks corresponding to the described steps. The computer program represented by the flow charts is repeated at predetermined intervals such as 5 msec. intervals.

Figure 6:
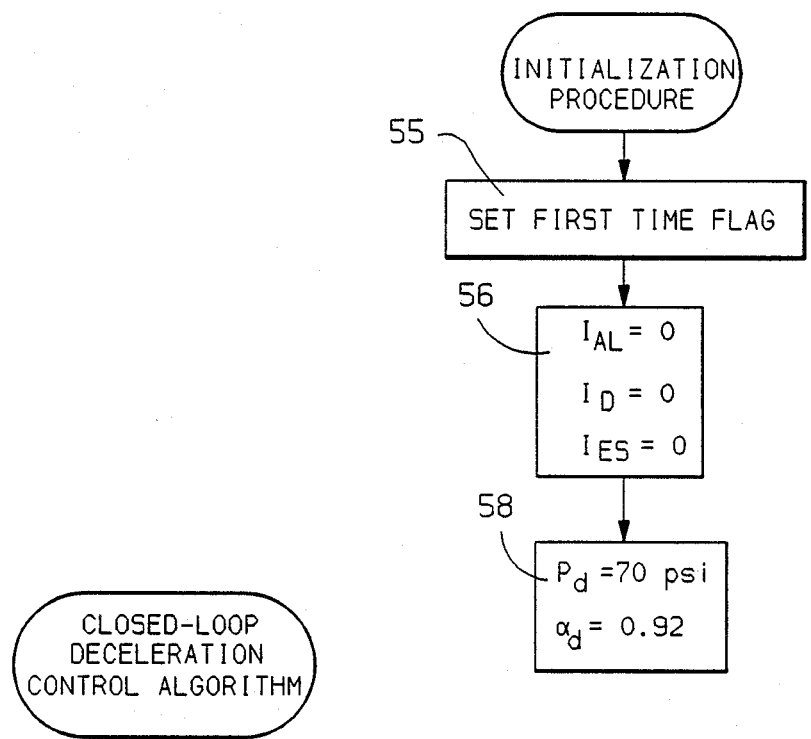

At the start of the program, the program repeatedly determines whether or not the vehicle driver has operated the brake pedal 20 to command vehicle deceleration <50>. This may be determined by monitoring the output d of the force sensor 18. The program then determines if this is the first time the brake pedal is operated such as by sampling the state of a first time flag <52>. If the program determines this is the first time the brake pedal has been operated as represented by a reset condition of the first time flag, an initialization procedure illustrated in FIG. 6 is undertaken to provide for system initialization whereat initial values are established and the initial flag states are established <54>. This initialization procedure is more specifically illustrated in FIG. 6 wherein the procedure sets the first time flag <55>, initializes an antilock flag IAL, a dump flag $I_D$ and an estimation flag IES to reset conditions <56> and initializes the values of brake pressure $P_d$ and a speed ratio term $\alpha_d$ (to be utilized in the pressure dump routine when the brake pressure is being limited during antilock brake control) to predetermined values <58>.

Figure 5:
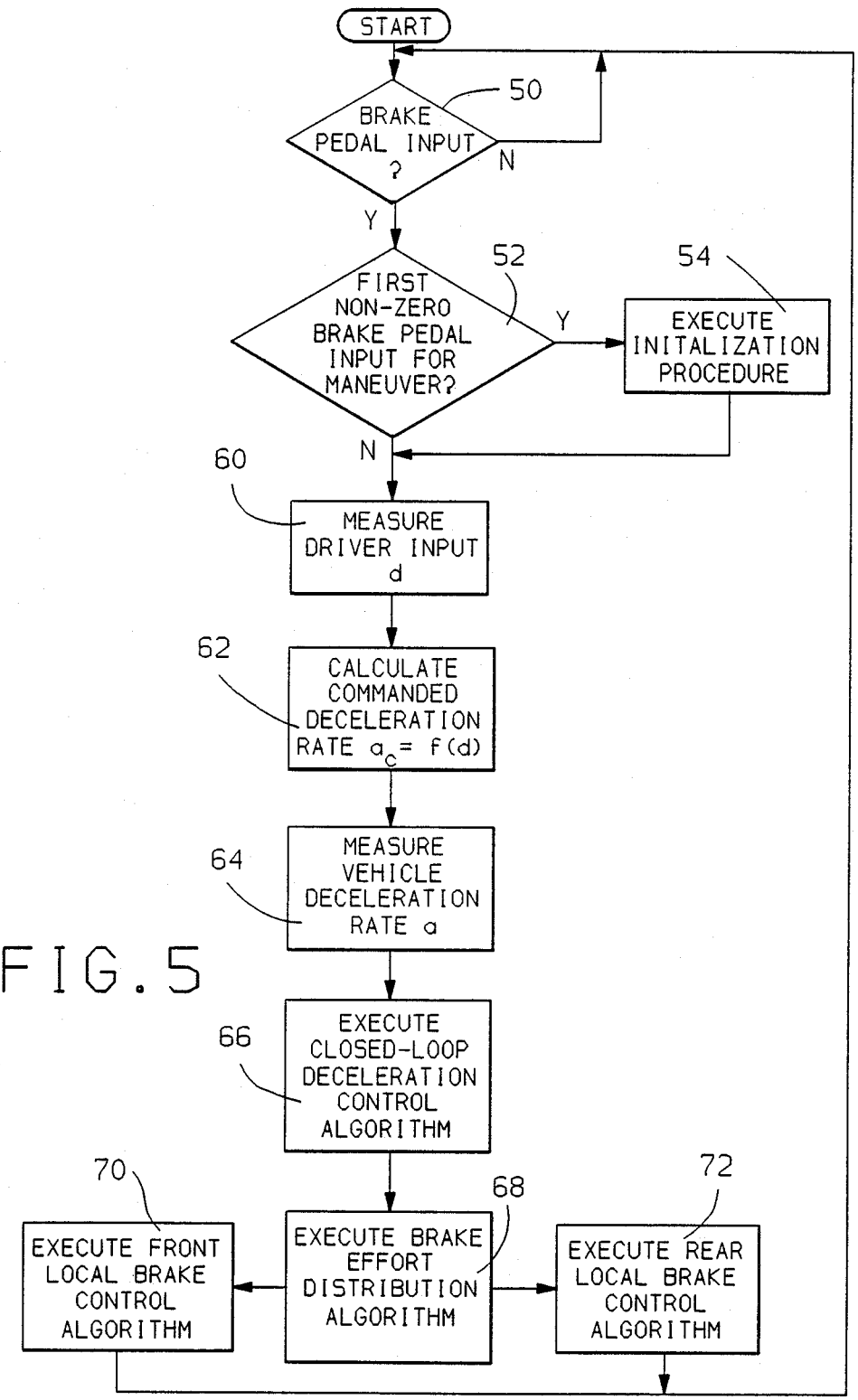

After the initialization procedure, or after the first time the routine of FIG. 5 is executed following a driver input to the brake pedal 20, the value of the driver input represented by the output d of the force sensor 18 is measured <60>. The operator commanded deceleration rate $a_c$ is then determined in accord with a predetermined function $f(d)$ <62>. The function f(d) may be any desired function establishing a desired feel of the braking system.

The vehicle deceleration rate a is next measured by measuring the output of the vehicle decelerometer. Based on this value, closed loop control of the vehicle deceleration so as to establish correspondence between the measured deceleration rate a and the commanded deceleration rate $a_c$ is executed <66>. The result of this routine is the commanded brake pressure value $P_c$ established at the supervisory control level illustrated in FIG. 3.

The program then determines the allocation of the commanded brake pressure $P_c$ between the front and rear wheel brakes. The result of this step is the determination of the commanded front wheel brake pressure $P_{cf}$ and the commanded rear wheel brake pressure $P_{cr}$ to be utilized at the local control level <68>.

The foregoing steps generally comprise the supervisory control level of the hierarchical brake control system of this invention. The details of the closed loop deceleration algorithm <66> and the brake distribution algorithm <68> will be described in greater detail in reference to FIGS. 7 and 8. The output established by the supervisory controller are the commanded front and rear brake line pressures $P_{cf}$ and $P_{cr}$ to be utilized at the local control level to establish the commanded brake pressures at the respective front and rear wheels of the vehicle.

Next, the routines at the local control level are executed to establish the commanded brake pressure $P_{cf}$ at the front driven wheels of the vehicle <70> and to establish the commanded brake pressure $P_{cr}$ at the rear wheels of the vehicle <72>. Following execution of the routines at the local control level, the program is repeated as previously described.

Figure 7:
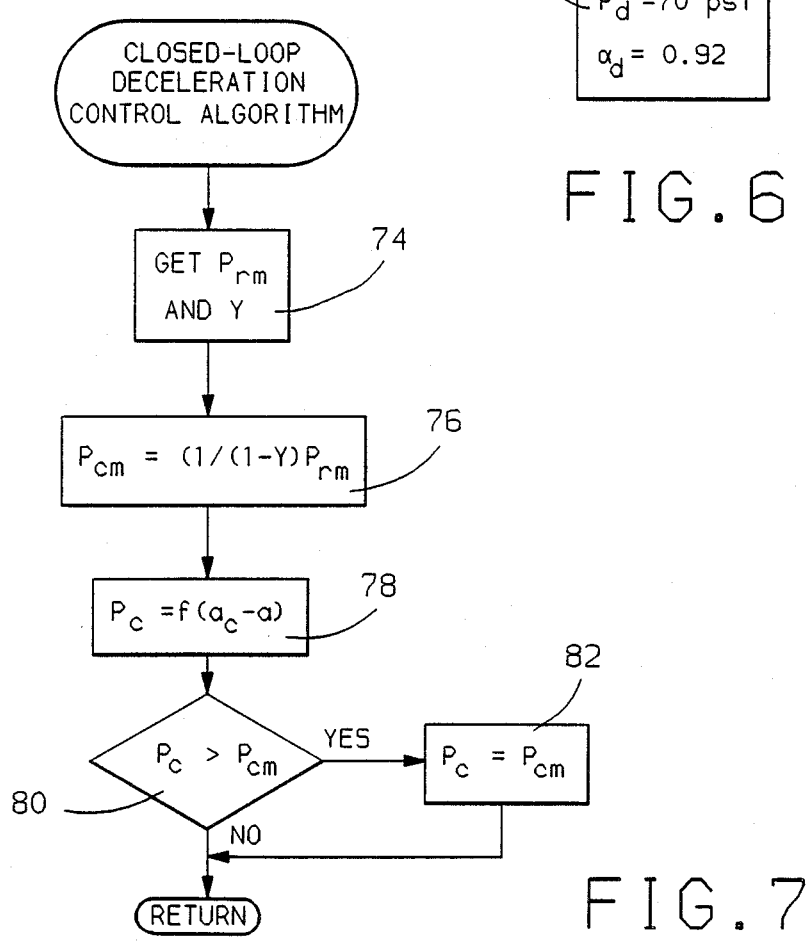

Referring to FIG. 7, the closed loop deceleration control algorithm <66> is illustrated. As previously indicated, this algorithm functions at the upper supervisory control level to establish a commanded brake pressure for each of the front and rear wheels of the vehicle to achieve the commanded deceleration rate $a_c$ established by the vehicle driver. This algorithm first retrieves the maximum rear brake line pressure $P_{rm}$ that can be attained before the two rear non-driven wheels will lock and retrieves the value of the distribution coefficient Y representing the proportioning of the commanded brake pressure between the front and rear wheel brakes <74>. The value of $P_{rm}$ is determined as will be described by the rear brake control algorithm <72> and specifically described in reference to FIG. 9 and the coefficient Y is determined by the brake effort distribution algorithm <68>.

From the retrieved values of $P_{rm}$ and Y, the routine then computes the maximum allowable brake line pressure $P_{cm}$ of the commanded brake pressure $P_c$. Based on the knowledge of the maximum allowable rear wheel brake pressure $P_{rm}$ and the current proportioning value Y, the maximum allowable value of $P_c$ is determined from the expression $$P_{cm}=(1/(1-Y))P_{rm}<76>. \qquad (6)$$

The routine next provides closed loop adjustment of the pressure command value $P_c$ as a function of the error between the commanded acceleration $a_c$ and the actual measured acceleration value a <78>. The function may include conventional integral and proportional terms to establish a command pressure $P_c$ resulting in the actual vehicle deceleration a attaining the commanded value $a_c$.

If the determined commanded pressure value $P_c$ is determined to be greater than the maximum allowable value $P_{cm}$ <80>, $P_c$ is set equal to $P_{cm}$ <82>. The commanded brake pressure value $P_c$ resulting from the routine of FIG. 7 is then utilized in the brake effort distribution algorithm <68> to apportion the commanded brake pressure $P_c$ between the front and rear wheel brakes. This routine is specifically described in FIG. 8.

Figure 8:
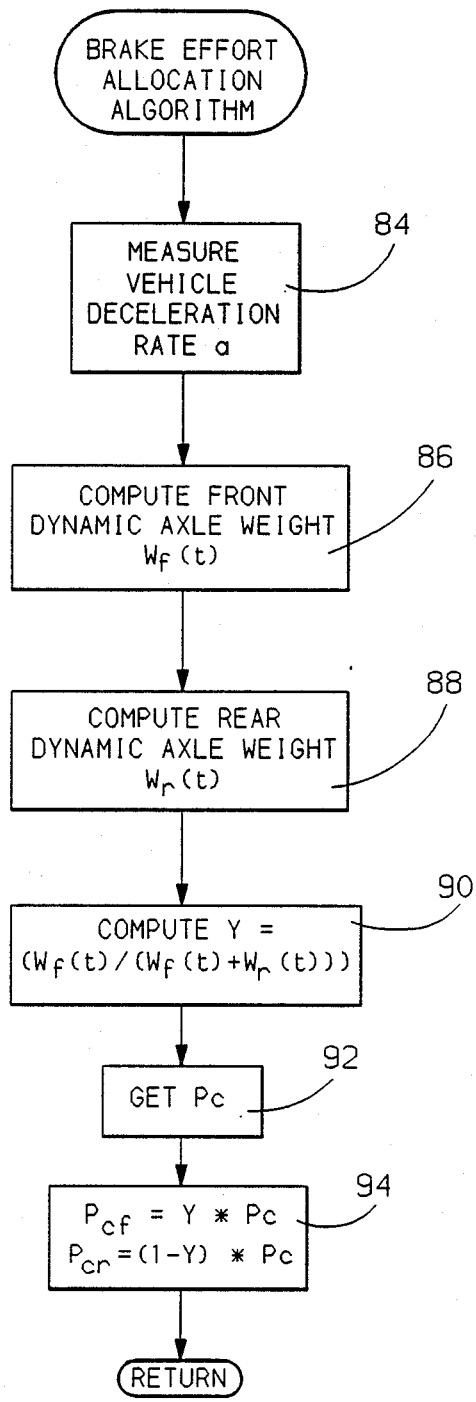

Referring to FIG. 8, the vehicle deceleration rate a is measured <84> to be used in computing the front and rear dynamic axle weights $W_f(t)$ in accord with equations 3 and 4 <86>. Similarly, the rear dynamic axle weight $W_r(t)$ is determined using the same equations <88>. From these two dynamic axle weight values, the proportion of the commanded brake pressure to be distributed to the front and rear brakes is determined by computing in accord with equation 2 the value of Y which is the fraction of the commanded brake pressure to be allocated to the front wheel brakes <90>. The commanded pressure established by the closed loop deceleration control algorithm of FIG. 7 is then retrieved <92> and utilized to determine the commanded front wheel brake pressure $P_{cf}$ and the commanded rear brake pressure $P_{cr}$ based on the proportioning factor Y as previously described. These front and rear brake pressure command values are then utilized at the local control level to establish the front and rear wheel brake pressures.

Figure 9A:
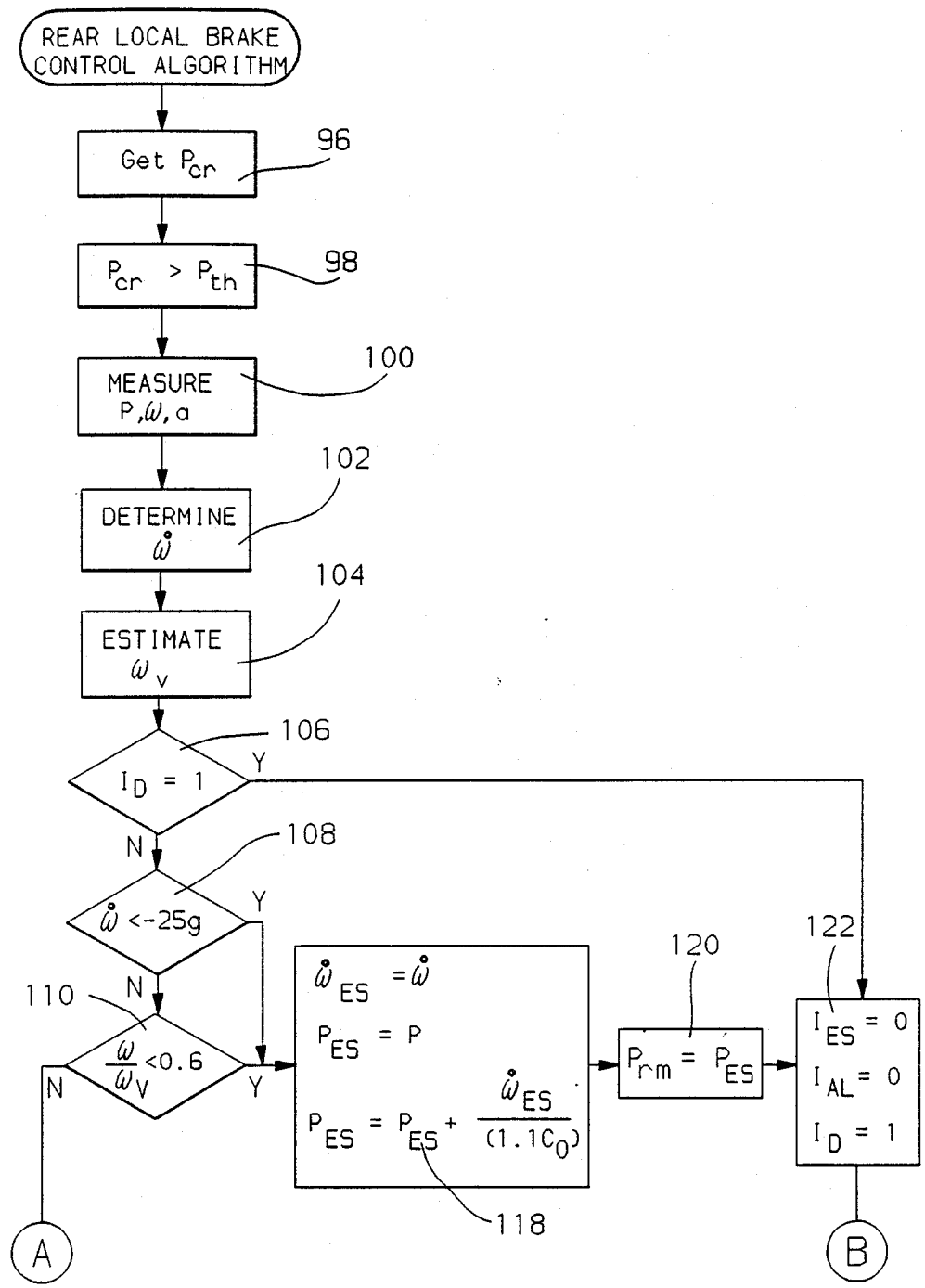
Figure 9B:
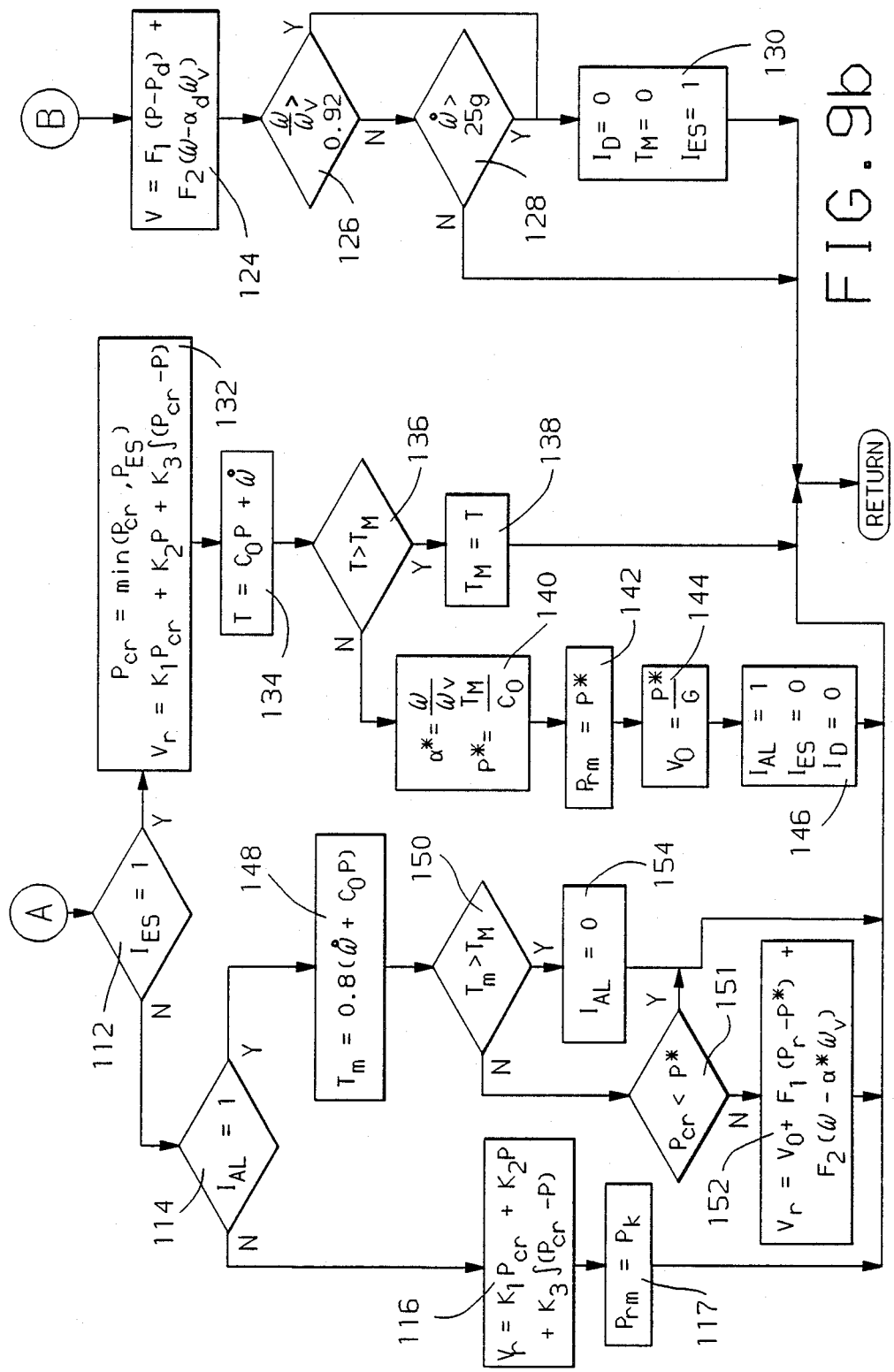

The rear local brake control algorithm at the local control level is illustrated in FIG. 9. The routine of FIG. 9 is executed for each rear wheel thereby controlling the pressure applied to each rear wheel brake independently. The rear local brake control algorithm first retrieves the value of the commanded rear brake control pressure value $P_{cr}$ <96> and compares it with a noise threshold level $P_{th}$ <98>. If the pressure command value is greater than the noise threshold, the values of the rear wheel brake pressure, wheel speed and the vehicle deceleration are measured via the ADU and the I/O <100>. From the last two measured values of wheel speed, the wheel acceleration $\dot{\omega}$ is determined <102> after which the speed of the vehicle is estimated <104>. The speed of the vehicle is represented by the speed $\omega_v$ of a hypothetical unbraked wheel. The estimation of this vehicle wheel speed value may be based upon the last determined value of vehicle speed that was pre measured and stored and vehicle deceleration. Alternatively, the vehicle speed may be estimated based upon wheel speed and wheel deceleration values such as illustrated in the U.S. Pat. No. 4,664,543 issued May 12, 1987 and assigned to the assignee of this invention.

The program then determines whether or not the brake control is set in a dump mode represented by the set state of a dump flag $I_D$ <106>. If the brake system is not in the dump mode, the program determines whether or not an incipient wheel lock condition exists at the rear wheel as represented by the wheel decelerating greater than a predetermined value such as $-25$ g <108> or by the wheel-vehicle speed ratio $\omega/\omega_v$ being less than a predetermined constant such as 0.6 representing 40% slip <110>. If the program determines that an incipient wheel lock condition at the rear wheel does not exist and the rear brake control is not placed in an estimation mode (a reset condition of an estimation mode flag $I_{ES}$) <112> or in an antilock mode (a reset condition of an antilock mode flag $I_{AL}$) <114> a power brake control mode is executed <116> wherein the voltage command value $V_r$ is provided to the digital-to-analog converter 48 which in turn applies the commanded voltage to the respective motor 26 of the rear brake modulator 14 to establish the commanded rear brake pressure $P_{cr}$. The voltage value $V_r$ may be adjusted by integral and proportional control terms in direction to achieve the commanded pressure $P_{cr}$ at the rear brake. The maximum allowable rear brake pressure value $P_{rm}$ is then set to some high value $P_k$ higher than any value of the commanded rear pressure $P_{cr}$ to allow the value of $P_c$ to be established unlimited.

As long as an incipient wheel lockup condition is not sensed, this power brake control mode is repeatedly executed to maintain the pressure applied to the rear brake at the commanded pressure $P_{cr}$. However, if the pressure applied to the rear brake becomes excessive resulting in the wheel approaching an incipient wheel lockup condition, the condition is sensed <108> <110> and various parameters existing at that point in time are stored. Particularly, the value of a pressure $P_{ES}$ to be used in an estimation mode to be described is first set to the value of the measured rear brake pressure $P_r$, the value of wheel acceleration $\omega_{ES}$ (having a negative value) to be used in the estimation mode is set equal to the value measured at step 102 and the value of the pressure value $P_{ES}$ is adjusted based on the expression $$P_{ES} = P_{ES} + \dot{\omega}_{ES}/K_1 C_o, \qquad (7)$$

where $C_o$ is a brake gain constant dependent upon brake system parameters such as the coefficient of friction of the brake linings <118>.

The unadjusted value of $P_{ES}$ is substantially larger than the brake pressure resulting in the maximum possible braking torque for the road surface due to the forces associated with wheel deceleration. The value of $P_{ES}$ is adjusted as above described to substantially the value producing the maximum possible braking torque that can be applied before the rear wheels will begin to lock. $K_1$ is greater than unity (such as 1.1) to assure the adjusted value of $P_{ES}$ is at least greater than the value producing the maximum possible braking torque so that the value producing the maximum braking torque can later be identified in the estimation mode to be described.

The maximum allowable commanded rear brake pressure value $P_{rm}$ is then set equal to the value of $P_{ES}$ determined at the step 118 <120>. This has the immediate effect of limiting the commanded front brake pressure $P_{cf}$ via the supervisory controller as previously described.

In order to prevent the wheels from locking, the local rear brake controller is then placed in a pressure dump mode by setting the dump flag $I_D$ <122>. The pressure is then dumped to allow recovery from the incipient lockup condition by controlling the voltage $V_r$ applied to the motor 26 of the rear brake modulator 14 at a value to establish the predetermined dump pressure value $P_d$ and a predetermined wheel speed $\omega$ defined by value $\alpha_d \omega_v$ where $\alpha_d$ is a predetermined value of the speed ratio $\omega/\omega_v$. The values of $P_d$ and $\alpha_d$ are established in the initialization routine of FIG. 6 <124>. These constants may be in one embodiment 70 psi and 0.96 respectively. The value of $V_r$ is established in accord with the following expression to establish the desired dump brake pressure value $P_d$ and the desired wheel speed value:

$$V_r = F_1(P - P_d) + F_2(\omega - \alpha_d \omega_v) \qquad (8)$$

where $F_1$ and $F_2$ are gain coefficients to establish a high gain feedback to regulate the controlled values of $P_d$ and the wheel speed $\omega$ defined by $\alpha_d \omega_v$ to the desired values. The relationship of $F_1$ and $F_2$ may be controlled to place greater weight on the control of pressure or wheel speed. For example, greater weight may be placed on the controlled parameter having the greatest measurement accuracy.

While the brake pressure is being controlled as per step 124 to reduce brake pressure and to provide for wheel speed recovery from the incipient wheel lockup condition, the system continuously monitors the wheel slip and wheel acceleration to determine recovery from the incipient wheel lockup condition. Recovery from the incipient wheel lockup condition is represented by the speed ratio $\omega/\omega_v$ becoming greater than a predetermined constant such as 0.92 <126> or when wheel acceleration becomes greater than a predetermined constant such as 25 g <128>. As long as these conditions do not represent recovery from the incipient wheel lockup condition, the dump routine is repeatedly entered from step 106 to continue to allow the wheel speed to recover from the incipient wheel lockup condition.

When the recovery is sensed <126> or <128>, the routine is placed in an estimation mode by setting an estimation mode flag $I_{ES}$ <130>. When this mode condition is sensed, the program sets the commanded rear brake pressure $P_{cr}$ at the minimum of the current value of the commanded brake pressure or the pressure $P_{ES}$ established at the step 118 <132>. The voltage $V_r$ provided to the motor 26 of the rear brake modulator 14 is then controlled to a value to establish the commanded rear brake line pressure $P_{cr}$ <132>. The control of this voltage is identical to the control during the power brake mode described at step 116 and similarly may include proportional and integral control terms to precisely establish the rear brake pressure $P_r$ equal to the commanded value $P_{cr}$.

As the step 132 increases the brake pressure $P_r$ toward the commanded value $P_{cr}$, the estimation routine determines the braking torque per unit of wheel inertia T as defined by the expression $$T = C_o P + \dot{\omega}, <134>. \qquad (9)$$

The peak value $T_M$ of the determined braking torque T as the brake pressure is increased to $P_{cr}$ is determined by comparing the calculated value with a stored value of $T_M$ <136>. If the value is greater than the stored value, the stored value is updated with the new larger value determined at step 134 <138>.

When the difference between the determined value of braking torque T and the stored value $T_M$ becomes negative, then the wheel slip is at the critical slip value establishing the maximum possible tractive force between the wheel and road surface. At this point in time, the speed ratio $\omega/\omega_v$ is the optimum ratio $\alpha^*$ corresponding to the critical slip and the optimum brake pressure establishing the maximum possible brake torque $T_M$ may be determined. The optimum brake pressure $P^*$ is determined in accord with the expression $$P^* = T_M/C_o. \qquad (10)$$

Wheel deceleration during reapplication of brake pressure in the estimation mode may be significant and is therefore a factor in the calculation of brake torque at step 134. However, in determining the optimum pressure value $P^*$ that will establish the peak brake torque $T_M$, wheel dynamics are ignored because the rate of change in wheel speed is negligible when the pressure is controlled steady state at the optimum pressure $P^*$ in the anti-lock braking mode to be described. The optimum values $\alpha^*$ and $P^*$ are stored for use in the anti-lock braking mode <140>. The maximum rear brake pressure value $P_{rm}$ is then set equal to the optimum brake pressure $P^*$ <142>.

A voltage $V_o$ representing the steady state motor voltage required to achieve the optimum brake pressure value $P^*$ is determined by the expression $P^*/G$ where G is a predetermined constant representing the relationship between the voltages applied to the motor 26 and the resulting pressure established thereby <144>. The local rear brake controller is then placed in an antilock mode by setting an antilock mode flag $I_{AL}$ and resetting the remaining mode flags <146>.

When an antilock mode is sensed <114>, an antilock control algorithm is executed that first determines whether or not the rear wheel has experienced a transition from a low to high coefficient of friction road surface. This is accomplished by first establishing a braking torque value $T_m$ that is a predetermined fraction such as 0.8 of the actual brake torque value <148>. As long as this value is less than the previously identified peak brake torque value $T_M$ during the estimation mode, the coefficient of friction of the road surface over which the rear wheel is traveling has not significantly increased.

As long as the program determined that the road surface coefficient of friction has not increased <150> and that the commanded rear brake pressure is not less than the optimum pressure $P^*$ <151>, the voltage $V_r$ provided to the motor of the rear brake modulator 14 is controlled to regulate the rear brake pressure $P_r$ at the optimum brake pressure value $P^*$ and the wheel speed $\omega_r$ at the optimum value $\alpha^* \omega_v$ <152>. In general, the pressure is regulated in accord with the control law $$P_r = P^* + F_1(P - P^*) + F_2(\omega - \alpha^* \omega_v). \qquad (11)$$

Specifically, the voltage $V_r$ applied to the motor of the brake modulator to implement the control law is defined by the expression:

$$V_r = V_o + F_1(P - P^*) + F_2(\omega - \alpha^* \omega_v), \qquad (12)$$

where the values of $F_1$ and $F_2$ are the gain values as previously described in regard to step 124 in the dump mode routine. By so controlling the voltage $V_r$ during the antilock mode, the system braking performance is insensitive to parameter variations such as vehicle speed, road surface conditions and coefficient of friction of the brake pads of the wheel brakes.

If the road surface coefficient of friction should increase such that the value of $T_m$ calculated at step 148 becomes greater than the peak torque value $T_M$ attainable on the lower coefficient of friction surface, <150> or if the commanded rear brake pressure $P_{cr}$ becomes less than the optimum pressure <151>, the routine ends the antilock mode by resetting the antilock mode flag $I_{AL}$ <154>. The rear local brake control algorithm is then returned to the power brake mode wherein the step 116 is executed to establish the voltage $V_r$ be applied to the motor of the rear brake modulator 14 to control the rear brake pressure $P_r$ at the commanded rear brake pressure $P_{cr}$ as previously described.

As previously indicated, the rear local brake control algorithm of FIG. 9 is executed for each of the left and right rear non-driven wheels of the vehicle. The control of the pressure to the front wheel brakes are provided only through the execution of a power brake routine as illustrated at step 116 of FIG. 9. In this case, the voltage applied to the front wheel brakes is controlled in accord with the commanded brake pressure value $P_{cf}$ and the measured value in accord with proportional and integral control terms so that the pressure $P_f$ applied to the front wheel brakes is controlled to the commanded value. Even though the front brakes are not controlled via an antilock control algorithm as in the local rear brake control algorithm, the brake pressure applied to the front wheel brakes are controlled so as to prevent lockup through the relationship of the front and rear brake pressures that are established by the proportioning factor Y. As described in reference to FIG. 9, the maximum allowable rear brake pressure $P_{rm}$ is set at a value establishing the peak braking torque for the existing road surface condition. Through the brake effort allocation algorithm of FIG. 8, the commanded brake pressure $P_c$ and the commanded front brake pressure $P_{cf}$ derived therefrom (taking into consideration the proportioning factor Y) are established at values resulting in the maximum brake torque for the road surface condition being established at the front wheels without the requirement of the execution of an antilock brake control routine.

Since the front brakes are not controlled by an antilock brake control routine and are not dumped and then re-applied as described in regard to the rear local brake control algorithm, the design of the actuator 14 for the front wheels do not require high response speeds thereby simplifying their designs. This further provides for maximizing the braking effort in the front wheels without the requirement of the execution of the more complex control routine of FIG. 9.

The foregoing description of a preferred embodiment of the invention for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A system for controlling the brake pressure applied to the brakes of the front and rear wheels of a vehicle, the system comprising in combination:
   means for generating a brake pressure command value $P_c$ in accord with an operator commanded braking value;
   means for generating a front brake pressure command $P_{cf}$ having a value $Y*P_c$ where Y is a desired front-to-rear proportioning brake pressure ratio;
   means for generating a rear brake pressure command $P_{cr}$ having a value $(1-Y)P_c$;
   front brake pressure control means for controlling the brake pressure applied to each of the front wheel brakes to the value $P_{cf}$;
   rear brake pressure control means, the rear brake pressure control means including means for controlling the brake pressure applied to each of the rear wheel brakes to the lesser of the value $P_{cr}$ or a value $P_{rm}$ determined to prevent a rear wheel lock-up condition; and
   means for limiting the brake pressure command value $P_c$ to a maximum value $P_{cm}$ having a value $(1/(1-Y))P_{rm}$, whereby the front brake pressure command $P_{cf}$ is limited to a value preventing front wheel lock-up based on the rear brake pressure value $P_{rm}$ determined to prevent a rear wheel lock-up.

2. The system of claim 1 wherein the operator commanded braking value is a commanded vehicle deceleration value and the means for generating the brake pressure command value $P_c$ includes (A) means for sensing vehicle deceleration and (B) means for adjusting the brake pressure command value $P_c$ to establish the sensed vehicle deceleration at the commanded vehicle deceleration value.

3. A system for controlling the brake pressure applied to the brakes of the front and rear wheels of a vehicle traveling over a road surface, the system comprising in combination:
   means for generating a brake pressure command value $P_c$ in accord with an operator commanded braking value;
   means for generating a front brake pressure command $P_{cf}$ having a value $Y*P_c$ where Y is a desired front-to-rear proportioning brake pressure ratio;
   means for generating a rear brake pressure command $P_{cr}$ having a value $(1-Y)P_c$;
   front brake pressure control means for controlling the brake pressure applied to each of the front wheel brakes to the value $P_{cf}$;
   rear brake pressure control means, the rear brake pressure control means including for each rear wheel (A) means for controlling the rear wheel brake pressure to the rear brake pressure command value $P_{cr}$ when the value $P_{cr}$ is less than a maximum value $P_{rm}$ and to the maximum value $P_{rm}$ when the value $P_{cr}$ is greater than $P_{rm}$, (B) means for detecting an incipient wheel lockup condition and (C) means responsive to an incipient wheel lockup condition to establish the value of $P_{rm}$ at the maximum brake pressure that can be attained before an incipient wheel lockup condition will occur; and
   means for limiting the brake pressure command value $P_c$ to a maximum value $P_{cm}$ having a value $(1/(1-Y))P_{rm}$, whereby the front brake pressure command $P_{cf}$ is limited to a maximum front wheel pressure before an incipient wheel lockup condition will occur.

4. The system of claim 3 wherein the operator commanded braking value is a commanded vehicle deceleration value, the means for generating the brake pressure command value $P_c$ includes (A) means for sensing vehicle deceleration and (B) means for adjusting the brake pressure command value $P_c$ to establish the sensed vehicle deceleration at the commanded vehicle deceleration value.

5. The system of claim 4 further including (A) means for determining the normal weight $W_f(t)$ on the road surface at the front wheels as a predetermined function of vehicle deceleration and for determining the normal weight $W_r(t)$ on the road surface at the rear wheels as a predetermined function of vehicle deceleration and (B) means for determining the value of Y in accord with the expression $Y = W_f(t)/(W_f(t) + W_r(t))$.

6. A method of controlling the brake pressure applied to the brakes of the front and rear wheels of a vehicle, the method comprising the steps of:
   generating a brake pressure command value $P_c$ in accord with an operator commanded braking value;
   generating a front brake pressure command $P_{cf}$ having a value $Y*P_c$ where Y is a desired front-to-rear proportioning brake pressure ratio;
   generating a rear brake pressure command $P_{cr}$ having a value $(1-Y)P_c$;
   controlling the brake pressure applied to each of the front wheel brakes to the value $P_{cf}$;
   controlling the brake pressure applied to each of the rear wheel brakes to the lesser of the value $P_{cr}$ or a value $P_{rm}$ determined to prevent a rear wheel lock-up condition; and
   limiting the brake pressure command value $P_c$ to a maximum value $P_{cm}$ having a value $(1/(1-Y))P_{rm}$, whereby the front brake pressure command $P_{cf}$ is limited to a value preventing front wheel lock-up based on the rear brake pressure value $P_{rm}$ determined to prevent a rear wheel lock-up.

* * * * *